United States Patent [19]

Sweeny

[11] Patent Number: 5,330,234
[45] Date of Patent: Jul. 19, 1994

[54] EXHAUST COUPLING WITH AN ADJUSTABLE AIRWAY

[76] Inventor: Henry D. Sweeny, c/o Mechanics Safety Company Inc., 560 Conestogo Road, Waterloo, Ontario, Canada, N2L 4E3

[21] Appl. No.: 983,567
[22] PCT Filed: Aug. 8, 1990
[86] PCT No.: PCT/CA90/00249
  § 371 Date: Feb. 8, 1993
  § 102(e) Date: Feb. 8, 1993
[87] PCT Pub. No.: WO92/02311
  PCT Pub. Date: Feb. 20, 1992
[51] Int. Cl.⁵ ............................................. F16L 21/00
[52] U.S. Cl. ................................. 285/62; 285/924; 285/177; 285/345
[58] Field of Search .............. 285/177, 8, 91, 345, 285/62, 924; 454/903

[56] References Cited

U.S. PATENT DOCUMENTS

| | | | |
|---|---|---|---|
| 1,580,694 | 4/1926 | Smith | 285/924 |
| 2,620,893 | 12/1952 | Holt et al. | 285/8 |
| 2,733,668 | 2/1986 | Pfetzing | 285/62 |
| 2,990,198 | 6/1961 | Imming | 285/9.1 |
| 3,148,895 | 9/1964 | Jasper | 285/345 |
| 3,288,497 | 11/1966 | Nydam | 285/345 |
| 4,318,547 | 3/1982 | Ericson | 285/177 |
| 4,779,904 | 10/1988 | Rich | 285/345 |
| 5,096,230 | 3/1992 | Pauscn et al. | 285/62 |
| 5,235,264 | 8/1992 | Elliot-Moore | 285/924 |

FOREIGN PATENT DOCUMENTS

| | | | |
|---|---|---|---|
| 497622 | 12/1950 | Belgium | 285/345 |
| 983819 | 6/1951 | France | 285/345 |
| 284671 | 1/1935 | Italy | 285/345 |
| 412829 | 4/1947 | Italy | 285/345 |
| 8204189 | 12/1983 | Netherlands . | |

*Primary Examiner*—Eric K. Nicholson
*Attorney, Agent, or Firm*—Jones, Tullar & Cooper

[57] ABSTRACT

A coupler is provided for connecting a vehicle exhaust pipe to an exhaust extractor hose. The coupler (30,114) has a housing (32,116) with an inlet end (3,124) and an outlet end (36,118). A curtain wall assembly (68,122) is provided at the inlet end to sealingly receive the exhaust pipe. The curtain wall assembly comprises at least a pair of facially abutting curtain wall members (70, 126) defining adjacent mutually offset flexible flap members (78,140) that deflect and seal around the exhaust pipe. A peripheral clamping ring (80, 128) clamps the curtain wall members together. The housing is provided with air passageway holes (52,145) and a slider member (56,144) having air passage holes (58,146) which is slidable on the housing to bring the holes (58,146) into or out of registry with the holes (52,145) to increase or decrease airflow through the holes (52,145).

11 Claims, 4 Drawing Sheets

EXHAUST COUPLING WITH AN ADJUSTABLE AIRWAY

TECHNICAL FIELD

This invention relates to exhaust couplings used to connect a vehicle's exhaust system to an exhaust extraction hose.

BACKGROUND ART

When a vehicle is serviced it is usually located within a private garage, a service station or a multi-bay facility at an automotive dealership. Although many service functions are performed while the vehicle is not running it is not possible to effectively tune the vehicle's engine without running the engine at various speeds. Such operation results, of course, in the creation of exhaust and it is necessary to therefore ensure that the exhaust is removed from the confines of the service facility to avoid the harmful effects of carbon monoxide contained in the exhaust gases.

In the past many service facilities have connected a long flexible hose to the end of the vehicle's exhaust pipe with the hose then being led outside the service facility, perhaps under or though a roll-up garage door. This arrangement is quick and easy to use but it is not an optimal solution to the problem because there can be considerable leakage past the hose end where it is connected to the vehicle's exhaust pipe, especially if there is not a close match of hose and pipe diameters. Different manufacturers often utilize different diameter exhaust pipes and each service facility will be reluctant to stock exhaust extraction hoses of different sizes just to accommodate these various exhaust pipe diameters. A hose which fits tightly on the largest exhaust pipe will fit loosely on the smallest pipe, whereas a hose that fits tightly on the smallest pipe will probably not stretch sufficiently to fit the largest pipe. The first condition results in leakage whereas the second condition means that several sizes of exhaust hose will be needed to fit all sizes of exhaust pipe.

An obvious solution to this problem is a coupler that can fit over the end of an exhaust pipe, no matter what its diameter might be, and will then connect to an exhaust hose of an appropriate diameter. Such a coupler should obviate the problems discussed above.

One attempt at providing such a coupler is found in U.S. Pat. No. 4,779,904 of Oct. 25, 1988. That patent teaches a coupler having means for connection to exhaust hoses of different sizes and an assembly of radially inwardly directed nylon bristles which are intended to provide a seal around an exhaust pipe. The bristles are deflected rearwardly when the unit is placed over the exhaust pipe and the unit should accommodate any size of exhaust pipe. During use, however, the bristles tend to become brittle and worn and they lose very quickly their ability to seal the coupler to the exhaust pipe.

Another problem which must now be addressed, and which is not solved by the '904 coupler, is the recent mandated requirement that service facilities provide an automatic powered system which draws exhaust fumes by vacuum, through filtration equipment to the outside environment. With such a system the exhaust hoses are connected to the vacuum equipment which in turn filters and then exhausts the filtered gases to the atmosphere. With the '904 coupler in place, and assuming proper operation, the utilization of automatic vacuum systems could have a deleterious effect on the engine adjustments since the engine would not be performing at standard operating conditions, the exhaust being extracted under vacuum rather than exiting normally to the atmosphere.

DISCLOSURE OF THE INVENTION

The present invention addresses the two problems associated with the coupler of the '904 patent by providing means for improving the sealing between the coupler and the exhaust pipe and by providing adjustable means by which air can be introduced into the flowing exhaust to compensate for increased flow rates occasioned by the use of automated extraction equipment.

The present invention provides a housing having an inlet end and an outlet end, the outlet end being of smaller diameter and being adapted for connection to an exhaust extraction conduit or hose. The larger diameter inlet end is provided with an insert which defines a curtain wall made up of at least two adjacent sets of inwardly directed, generally triangular, flap members, the flap members of one set being angularly offset from the flap members of the adjacent set. When the coupler is slid onto an exhaust pipe the flap members deflect rearwardly and conform to the contour of the exhaust pipe, the overlapping flap members of adjacent sets ensuring a complete seal around the pipe. Preferably the flap members are made from a silicone rubber material which can withstand the heat and chemical make-up of the exhaust gases.

In order to compensate for the use of automatic extraction equipment the coupler housing is provided with a plurality of openings passing therethrough downstream of the curtain wall and there is also provided a slide member having corresponding openings therethrough, the slide member being movable on the housing to slidably bring the openings thereof into or out of registry with the housing openings to thereby increase or decrease the flow of outside air into the extraction hose. The automotive technician can adjust the slide member to achieve a correct exhaust condition for any particular engine and he can thereafter tune the engine without concern for undue back-pressures which could affect the final state of tune for the engine. This becomes more important with modern engines which are computer-controlled and have a narrow band of acceptable conditions which result in optimum operating efficiency.

The present invention may therefore be considered as providing a coupler for connecting a vehicle exhaust pipe to an exhaust extraction hose, the coupling including a housing having an inlet end adapted for connection to the exhaust pipe, an outlet end adapted for connection to the extraction hose, and a curtain wall assembly positioned adjacent the inlet end for sealing contact with an exhaust pipe when in use, characterized in that: the curtain wall assembly comprises at least a pair of facially abutting flexible curtain wall members defining a plurality of flexible, mutually offset, adjacent flap members and a clamping ring member peripherally clamping the curtain wall members together; air passageway means extend through the housing downstream of the curtain wall assembly; and an adjustable slider member is provided on the housing, the slider member having air passage means which can be moved into and out of registry with the air passageway means to increase or decrease airflow through the air passageway means.

BRIEF DESCRIPTION OF THE DRAWINGS

FIG. 4 shows a longitudinal section of an exhaust coupler, incorporating an adaptor, in place on an automotive exhaust pipe;

FIG. 8 shows a curtain wall member used with the coupler of FIG. 7.

BEST MODE FOR CARRYING OUT THE INVENTION

Figure 1:
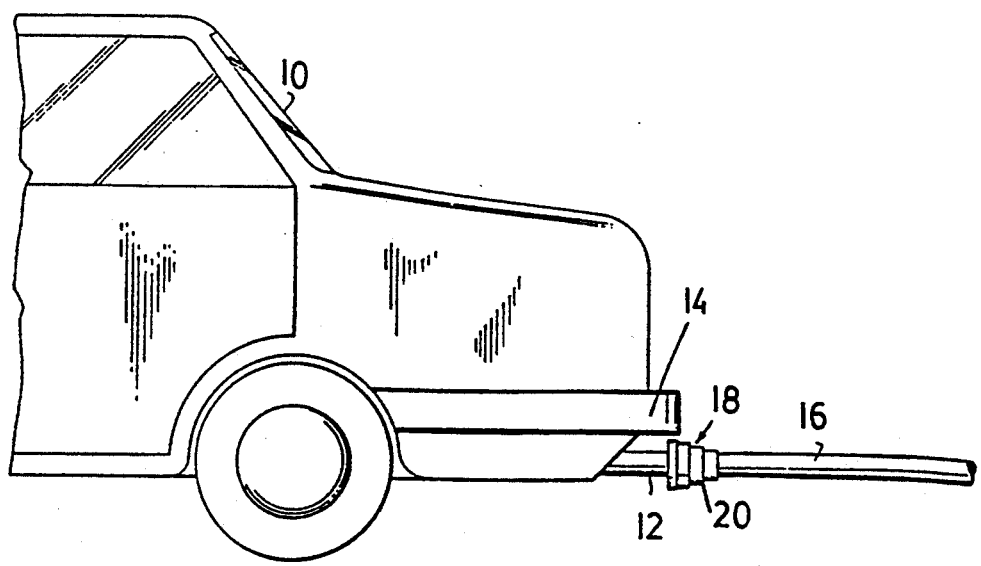
FIG. 1 shows a prior art system such as is taught in U.S. Pat. No. 4,779,904.

In order to understand the invention fully reference should be made to FIG. 1 which shows a prior art coupler system in use. In the figure an automobile is shown by reference number 10, the automobile having an exhaust pipe 12 terminating at the rear thereof adjacent the rear bumper 14. An exhaust extraction conduit or hose 16 is shown leading to an appropriate exhaust location (not shown). The extraction hose 16 is connected to the exhaust pipe 12 by way of the coupler 18, which coupler is shown as having a stepped outlet end 20 in the manner of the coupler of U.S. Pat. No. 4,779,904 to accommodate extraction hoses of different sizes.

The present invention is an improvement on the coupler of the '904 Patent and is illustrated in FIGS. 2 to 8.

Figure 2:
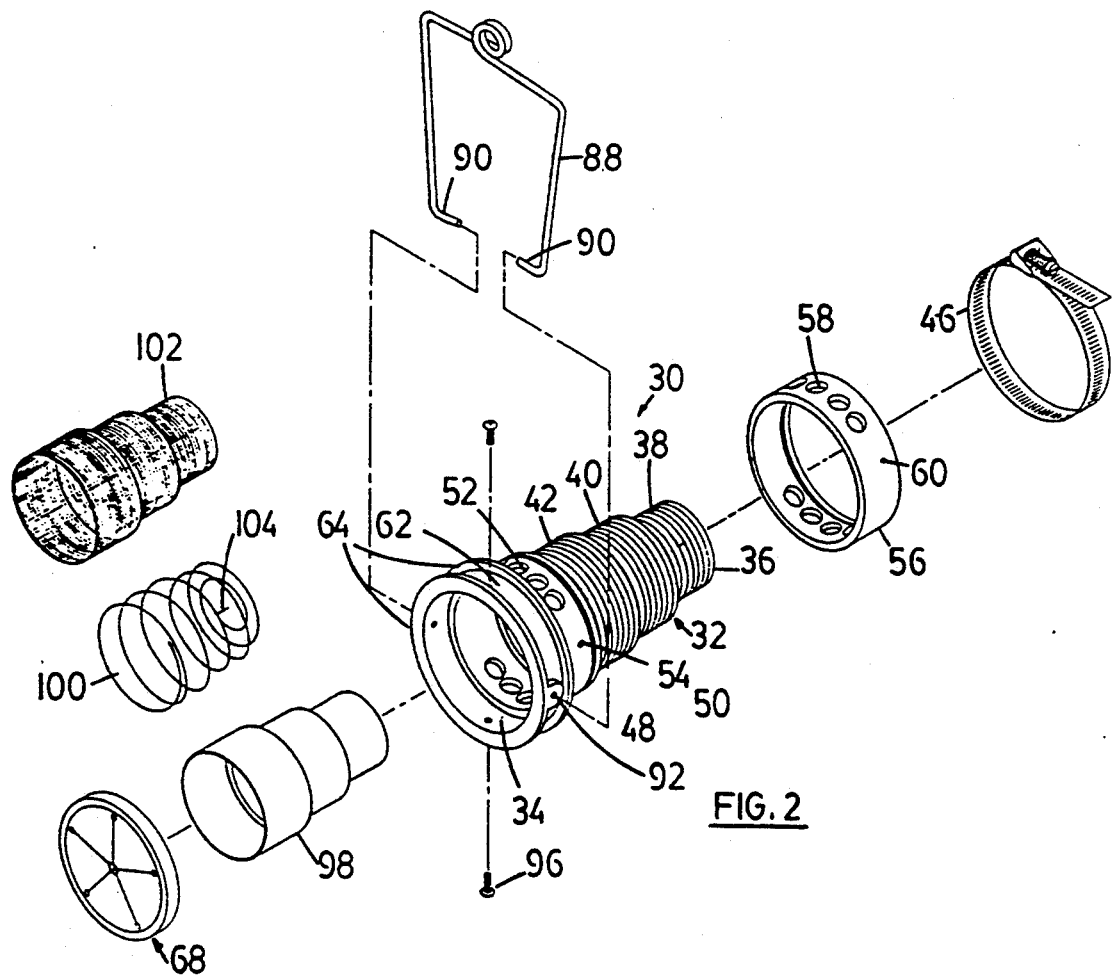
FIG. 2 shows an exploded view of the exhaust coupler of the present invention.
Figure 3:
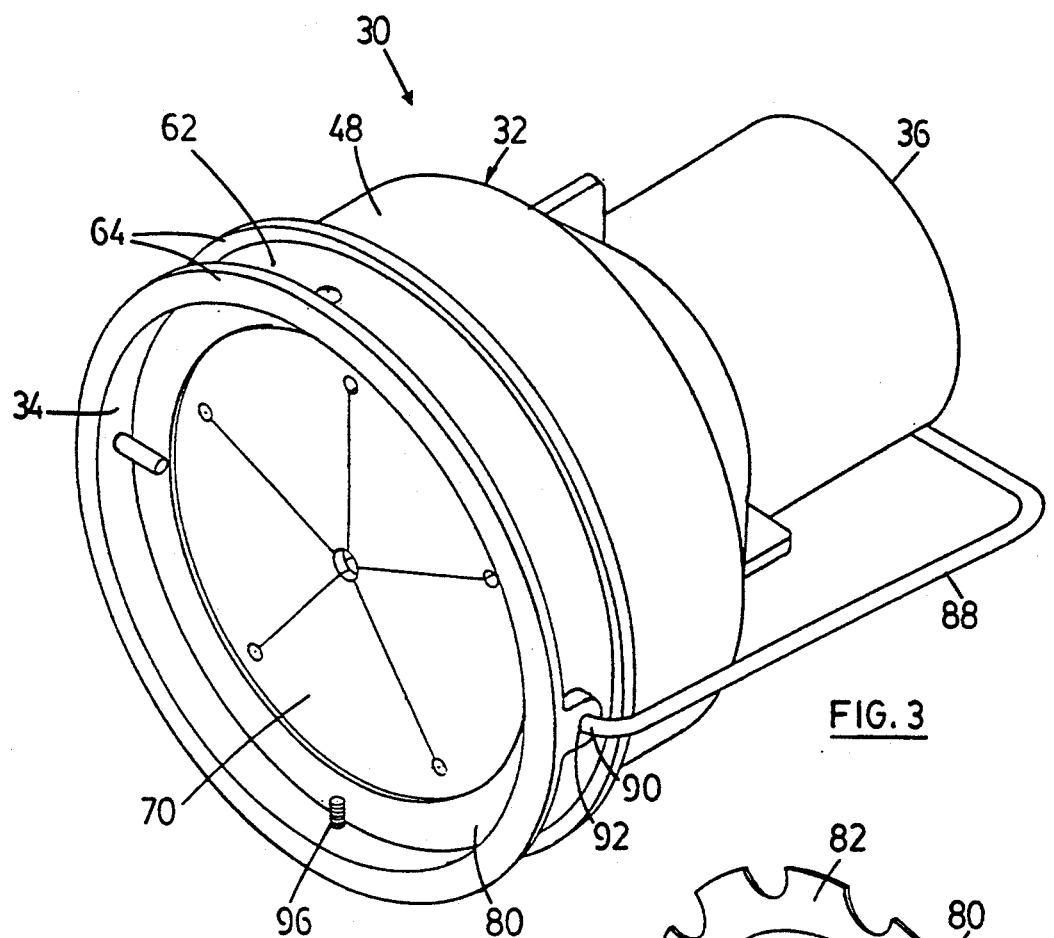
FIG. 3 shows an assembled view of an exhaust coupler of the present invention.

With particular reference to FIGS. 2, 3 and 4 the coupler 30 of the present invention is shown as having a multi-diameter stepped housing 32 having an inlet end 34 and a smaller diameter outlet end 36.

Working from the outlet end 36 towards the inlet end 34 it is seen that the coupler 30 is provided with three annular sections 38, 40 and 42 of increasingly larger diameter with section 38 being connected to section 40 which in turn is connected to section 42. Each section is optionally provided with triangular teeth 44 (FIG. 4) which may be molded or cut on the exterior surface of each section as a continuous thread or as a plurality of adjacent circular rings. Each section is intended to receive an extraction hose 16 of a corresponding diameter, the hose being secured to the section as by a hose clamp 46. The sections 38, 40, 42 are selected to have diameters corresponding to the standard commercially available hose sizes, the teeth 44 helping to secure the hose to the coupler to prevent inadvertent disconnection. The coupler of this invention will work with rubber, fabric-on-wire, or stainless steel extraction hoses.

The annular section 48 adjacent the section 42 has a slightly larger diameter and a smooth outer wall 50. In the embodiment as illustrated two sets of adjacent air passageway holes 52 pass through the section 48, the sets of holes being separated by imperforate sections 54 (FIG. 2). An annular adjusting ring 56 fits tightly over the section 48 for rotational sliding movement thereon. The ring, or slide member 56, is provided with through air passage openings 58 which correspond to openings 52 through section 48. By sliding the member 56 around the section 48 the openings 58 can be brought into registry with openings 52 for maximum airflow therethrough or the imperforate portion 60 of the member 56 can be brought into a covering condition to block the flow of air through the holes 52.

The openings 58 need not be identical in shape to the holes 52. In fact the openings 58 could be interconnected to form a short slot instead of a plurality of openings. Adjustable airflow would still be achieved with such an arrangement.

The inlet 34 is defined by a larger diameter inlet section 62 having raised annular ribs 64 thereon and defining an internal shoulder 66 adjacent section 48. The shoulder 66 provides a locating surface for the curtain wall assembly 68 shown in greater detail in FIGS. 5 and 6.

Figure 5:
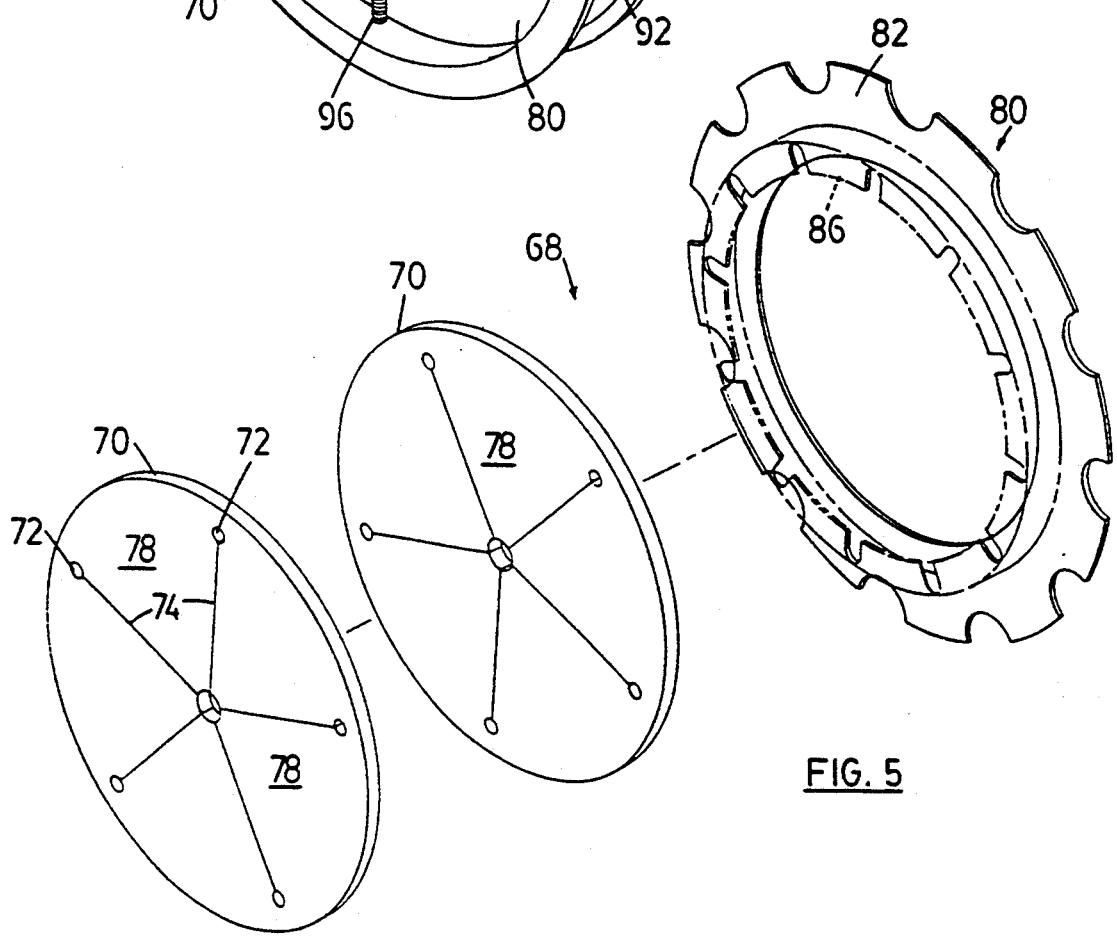
FIG. 5 shows a perspective exploded view of curtain wall assembly as used in the present invention.

As seen in FIG. 5 the curtain wall assembly utilizes a first curtain wall member 70 formed from a thin member of silicon rubber. The curtain wall 70 has a plurality of circumferentially spaced small stress relieving holes 72 and through slits 74, one each leading radially from a hole 72 to a central small hole 76. Each pair of adjacent slits 74 defines a generally triangular flap member 78.

The assembly 68 utilizes at least a pair of adjacently abutting curtain wall members 70 held together by a circumferentially extending clamping ring 80. The adjacent curtain wall members 70 are angularly offset one from the other so that each slit of one wall member is centrally located adjacent the flap member of the adjacent flap member. This provides overlap of the flap members when the coupler 30 is slid onto the exhaust pipe to improve the seal between the pipe and the coupler.

Figure 6:
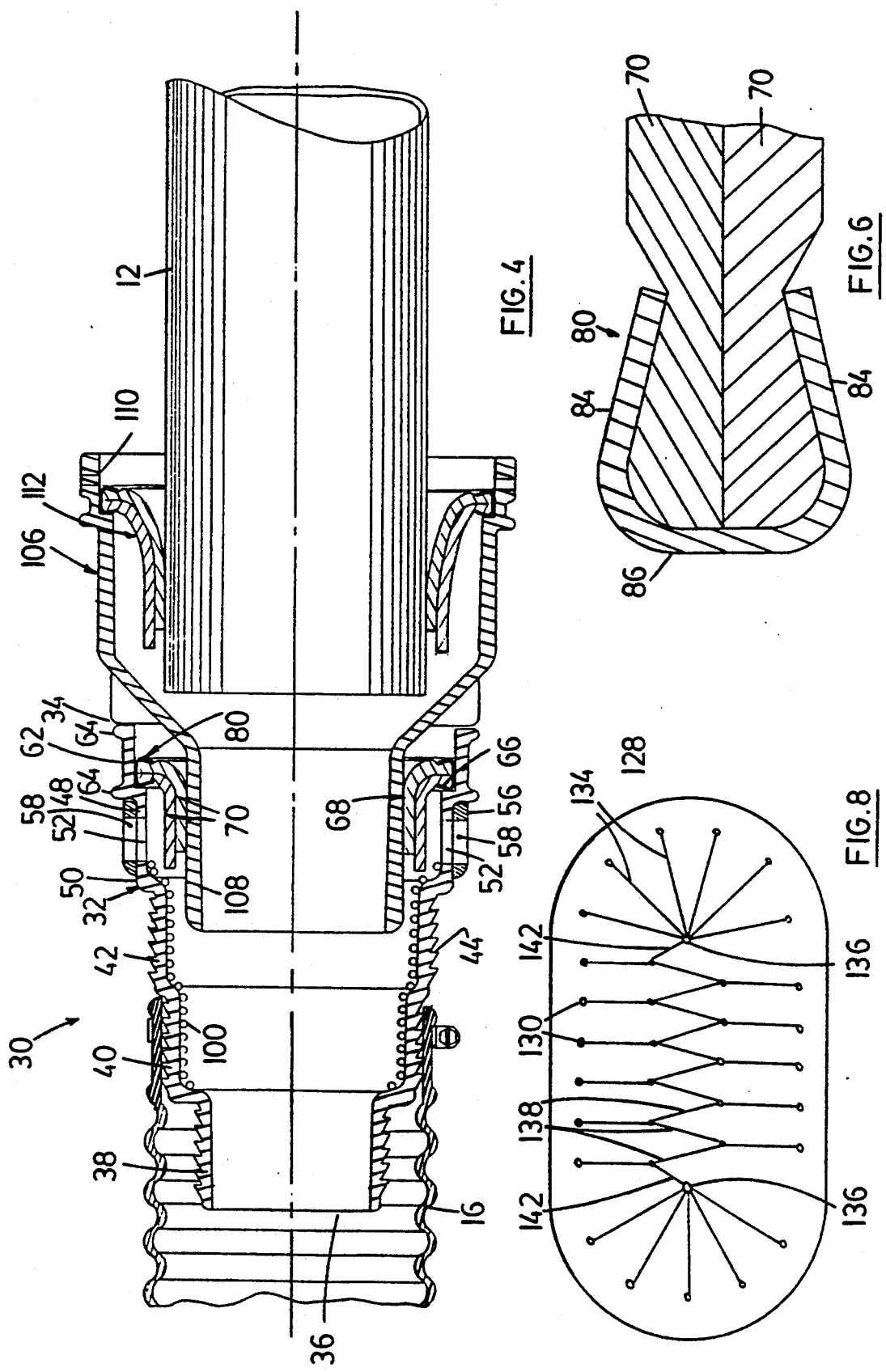
FIG. 6 shows a radial section through the curtain wall assembly.

As illustrated in FIGS. 5 and 6 the clamping ring 80 is a section of stainless steel having an annular, scalloped back plate portion 82 and a U-shaped annular clamping portion 86, the legs 84 of which are bent together to clamp the adjacent curtain wall members 70 therebetween. The assembly 68 is slid within the inlet section 62 with the clamping ring backing plate 82 abutting the shoulder 66.

A U-shaped handle 88 is provided to aid in handling the coupler 30, particularly desirable when the coupler is being removed from a hot exhaust pipe and it may also be hot. The handle has inwardly turned leg members 90 which fit into reinforced holes 92 in the section 62, the leg members 90 project into the inlet 34 adjacent the clamping ring 80 and help to retain the curtain wall assembly 68 in position, especially when the coupler 30 is being pulled from the exhaust pipe.

Further retention can be provided by one or more locking screws 96 threaded through the wall of section 62.

FIGS. 2 and 4 show two additional features which make the coupler more versatile and safer. FIG. 2 shows optional liner member 98, 100, 102, which can be inserted into the coupler to prevent damage from a hot exhaust pipe. The liners would preferably conform generally to the inside shape of the sections 38, 40 and 42 and preferably would be formed from aluminum.

Liner 98 could be formed from thin sheet aluminum shaped to conform to the interior of the housing whereas liner 102 could be formed from a composite material which is heat resistant. The preferred liner however is shown as 100 and is merely a spring-like insert having a sufficient number of turns at each diameter to prevent a hot exhaust pipe from contacting the coupler directly. In accordance with standard spring winding techniques the tail 104 of the liner 100 can extend across the small end thereof so as to act as a stop against over-penetration of the exhaust pipe into the coupler. A liner 100 is shown in position in FIG. 4.

FIG. 4 shows an adapter member 106 which can be used with exhaust pipes of larger diameter than are normally encountered. The adapter 106 has an outlet portion 108 of reduced diameter receivable in the curtain wall assembly 68 and an inlet portion 110 of larger diameter, which portion is adapted to receive a larger curtain wall assembly 112 substantially identical to the assembly 68 but of a larger diameter.

Figure 7:
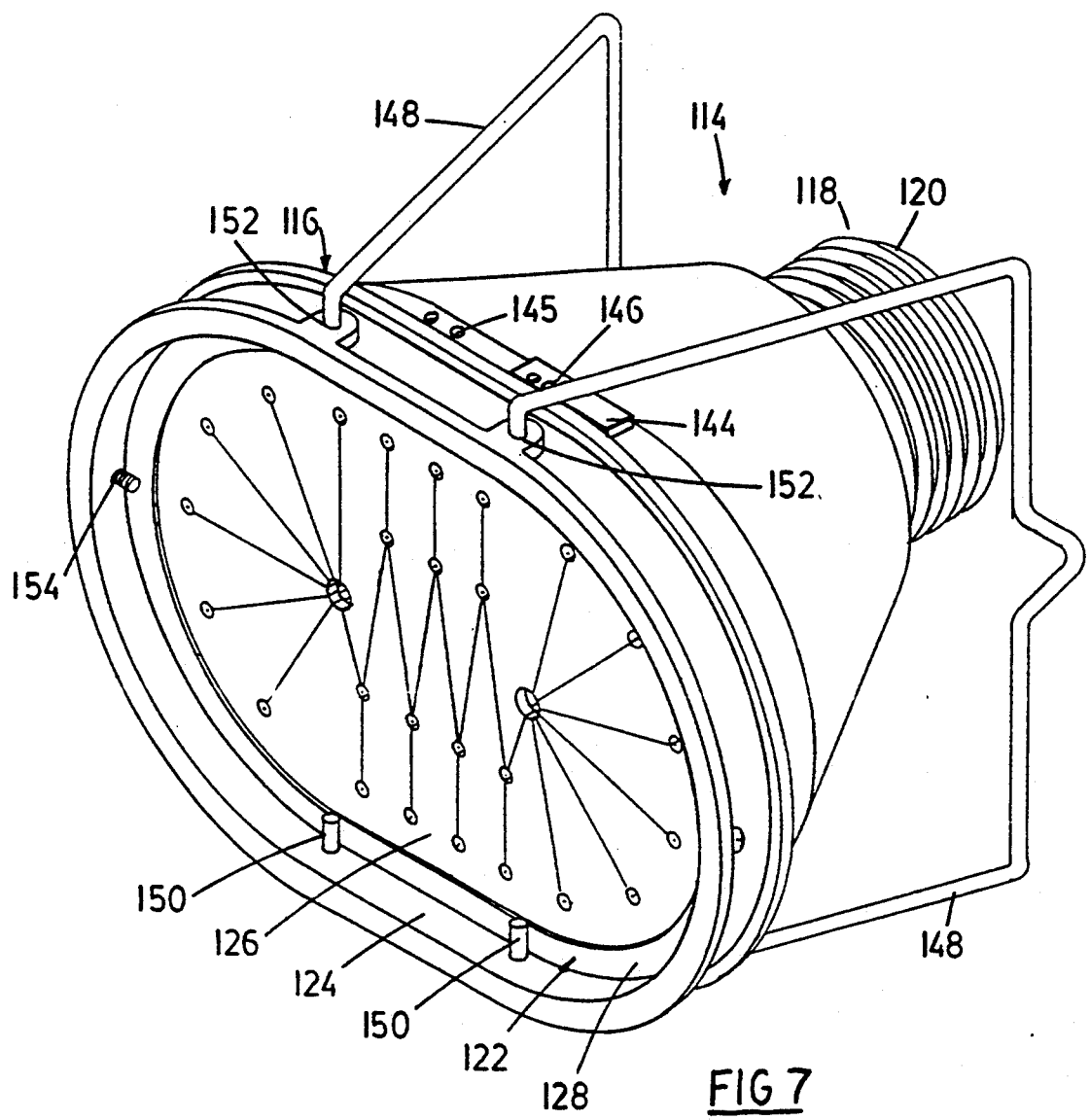
FIG. 7 shows a coupler for use with dual exhaust pipe systems.

FIGS. 7 and 8 illustrate a coupler 114 which can be used on its own or which could be used as an adapter, much like adapter 106. The coupler 114 is particularly effective with "dual exhaust" systems, wherein there is a pair of adjacent exhaust pipes positioned close and parallel to each other at the rear of the vehicle. As can be seen the coupler 114 has an obround housing 116 that tapers down to a cylindrical outlet 118 having teeth 120 thereon similar to teeth 44 previously described. If the coupler 114 is to be used as an adapter for a coupler 30, as in FIG. 2, then the teeth 120 might not be provided, so as to facilitate sealing between the curtain wall assembly 68 and the cylindrical outlet 118.

Coupler 114 is provided with a curtain wall assembly 122 which is analogous to assembly 68 and which fits snugly in the inlet end 124 of the housing 116. The assembly 122 is made up of at least a pair of adjacent curtain wall members 126 held together by a clamping ring 128. With references to FIG. 8 it is seen that each curtain wall member 126 has a plurality of spaced apart stress relieving holes 130 parallel to the edge of the member and spaced inwardly thereof. An inwardly directed slit 132 extends from each of the holes 130 positioned along the straight edges of the member 126 and a radially inwardly directed slit 134 extends from each of the holes 130 positioned along the arcuate end edges of the member 126. The slits 134 at each end meet at a small hole 136 coinciding generally with the appropriate center of curvature.

As seen in FIG. 8 the holes 130 along one straight edge are offset from the holes 130 along the other straight edge so that the slits emanating therefrom are mutually offset from each other. Each slit 132 has a length approximately ⅓ the distance between the two lines of holes 130 and the inner ends of the slits are joined by angled slits 138. The slits define adjacent flap members 140 which terminate in oppositely directed generally triangular portions in the central area of the curtain wall member. The angled slits 142 from the slits 132 closest to the ends of the curtain wall member terminate at the respective holes 136, making the curtain wall member asymmetrical about a longitudinal centerline. If two such curtain wall members are assembled with one inverted relative to the other then the flap members of one will overlap the flap members of the other as with the first embodiment so that the flap members of one curtain wall member are mutually offset from those of the adjacent curtain wall member. This improves sealing when dual exhaust pipes are inserted through the curtain wall. Also, the flap members 140 are sufficiently narrow that they will fill in the small space between the individual exhaust pipes to ensure sealing thereof.

If the coupler 114 is to be used as an adapter with the coupler 30 then it is not necessary to provide separate air adjustment means on the coupler 114. The air adjustment provisions of the coupler 30 would suffice. If the coupler 114 is to be used on its own then a sliding member 144 having holes 146 therethrough at one end thereof could be provided on the housing 116, suitably retained thereon for sliding movement with respect to matching holes 145 through the housing 116. The slide member 144 can be moved to bring its holes 146 into or out of registry with the housing holes to increase or decrease airflow into the extraction hose as desired.

U-shaped handles 148 are provided to carry, hang or move the coupler 114, the end legs 150 of the handles projecting through reinforced holes 152 to help retain the curtain wall assembly 122 in place. As with the first embodiment threaded retaining screws 154 can also be provided to help retain the assembly 122 in place.

Operation of the coupler 30 or 114 is simple and straightforward. By using the handle 88 or 148 the technician slides the coupler onto the exhaust pipe 16, pushing the coupler against the pipe so that the flap members of the curtain wall assembly spread and are bent backward as seen in FIG. 3. The resilient nature of the flap members forces them to conform to the shape of the exhaust pipe and the overlap provided by the rearmost flap members compensates for the spreading flap members of the forwardly adjacent curtain wall member, thereby preventing any substantial exhaust leakage. An extraction hose is fitted over the appropriate outlet section 38, 40 or 42 and is clamped thereto. Then the engine can be started and the technician can adjust the airflow control member 56 or 144 to obtain the correct exhaust pressures if the hose is connected to a vacuum exhaust extraction device. The technician can then tune the engine without fear of injury due to carbon monoxide fumes from the exhaust.

INDUSTRIAL APPLICABILITY

The present invention provides a reliable, economical coupler for vehicle service facilities, a coupler that effectively and sealingly connects the exhaust pipe to an extraction hose and also provides for airflow adjustment if required.

The foregoing has described preferred embodiments of the present invention. It is understood that a skilled practitioner could effect alternations to the structure as disclosed without departing from the spirit of the invention and hence the protection to be afforded the invention is to be determined from the scope of the claims appended hereto.

The embodiments of the invention in which an exclusive property or privilege is claimed are defined as follows:

1. A coupler for connecting a vehicle exhaust pipe to an exhaust extraction hose, said coupling including a housing (32,116) having an inlet end (34,124) adapted for connection to the exhaust pipe, an outlet end (36,118) adapted for connection to the extraction hose, and a curtain wall assembly (68,122) positioned adjacent the inlet end for sealing contact with an exhaust pipe when in use, characterized in that: said curtain wall assembly (68,122) comprises at least a pair of facially abutting flexible curtain wall members (70,126) defining a plurality of flexible, mutually offset, adjacent flap member (78,140), and a clamping ring member (80,128) peripherally clamping the curtain wall members (70,126) together; air passageway means (52,145) extend through said housing downstream of said curtain wall assembly, and an adjustable slider member (56,144) is provided on said housing, said slider member having air passage means (58,144) which can be moved into and out of registry with said air passageway means to increase or decrease airflow through the air passageway means.

2. The coupler of claim 1 characterized in that each of said curtain wall members (70) comprises a circular sheet of silicone rubber having a central through hole (76), a plurality of circumferentially spaced stress relieving holes (72) adjacent the periphery of the member, and a slit (74) extending from each hole (72) to the central hole (76) so as to define a plurality of adjacent generally triangular flap members (78).

3. The coupler of claim 1 characterized in that each of said curtain wall members (126) comprises an elongated sheet of silicone rubber having parallel side edges and rounded end edges, a plurality of spaced apart stress-relieving holes (130) adjacent said edges, slits (132,134) extending inwardly from said holes (130), and additional slits (138) interconnecting the ends of said slits (132) to define a plurality of adjacent flap members (140).

4. The coupler of claim 1 or claim 2 characterized in that said housing (30) includes a cylindrical portion (48) downstream of said curtain wall assembly (68), said air passageway means comprises a pair of spaced apart sets of through holes (52) and said air passage means comprises a pair of spaced apart sets of holes (58) through said slider member (56), said slider member (56) being in the form of an annular ring slidably rotatable on said cylindrical housing portion (48).

5. The coupler of claim 1 or claim 4 characterized in that said housing (116) has a plurality of holes (145) therethrough downstream of said curtain wall assembly (122), and said slider member (144) has a plurality of corresponding holes (146) extending therethrough.

6. The coupler of claim 1 characterized in that output end (118) of the coupler housing (116) is adapted to be sealingly received in the inlet end (34) of the coupler housing (32).

7. The coupler of claim 1 characterized in that a linear member (98,100,102) is receivable in said housing (32) to prevent contact between an exhaust pipe and an interior surface of said housing (32).

8. The coupler of claim 7 characterized in that said liner (98) is formed from aluminum to conform to the interior of said housing (32).

9. The coupler of claim 7 characterized in that said liner (100) is formed as a helical spring to conform to the interior of said housing (32), said spring having a tail (104) blocking passage of an exhaust pipe therepast.

10. The coupler of claim 7 characterized in that said linear (102) is formed of a composite material to conform to the interior of said housing (32).

11. The coupler of claim 1 characterized in that a generally U-shaped handle member (88,148) is provided, said handle having leg members (90,150) that pass through holes (92,152) in the housing just upstream of the curtain wall assembly (68,122) to help retain the curtain wall assembly in position at the inlet end of the housing.

* * * * *

UNITED STATES PATENT AND TRADEMARK OFFICE
CERTIFICATE OF CORRECTION

PATENT NO. : 5,330,234
DATED : July 19, 1994
INVENTOR(S) : Henry D. Sweeny

It is certified that error appears in the above-indentified patent and that said Letters Patent is hereby corrected as shown below:

Col. 7, claim 1, line 2, change "(58,144)" to --(58,146)--.
Col. 8, claim 6, line 1, change "output" to --outlet--.
Col. 8, claim 7, line 2, change "linear" to --liner--.

Signed and Sealed this

Twentieth Day of September, 1994

Attest:

Attesting Officer

BRUCE LEHMAN

Commissioner of Patents and Trademarks